United States Patent [19]

Iwata et al.

[11] 4,268,411

[45] May 19, 1981

[54] MICROCAPSULES HAVING A WALL OF INORGANIC SUBSTANCE AND PROCESS FOR THE PREPARATION THEREOF

[75] Inventors: Masahiro Iwata, Saitama; Yuichi Taka, Soka, both of Japan

[73] Assignee: Pentel Kabushiki Kaisha, Tokyo, Japan

[21] Appl. No.: 25,066

[22] Filed: Mar. 29, 1979

[30] Foreign Application Priority Data

Mar. 30, 1978 [JP] Japan .................................. 53/37332
Apr. 11, 1978 [JP] Japan .................................. 53/42347
May 29, 1978 [JP] Japan .................................. 53/64020
Jan. 22, 1979 [JP] Japan .................................... 54/6262

[51] Int. Cl.$^3$ .............................................. B01J 13/02
[52] U.S. Cl. ...................................... 252/316; 15/424;
106/20; 106/308 B; 156/283; 252/182;
252/192; 252/193; 252/364; 252/428; 252/477
R; 252/522 A; 422/42; 422/43; 426/98;
426/650
[58] Field of Search ........................... 252/316; 424/16;
427/185; 422/42, 43

[56] References Cited

U.S. PATENT DOCUMENTS

| | | | |
|---|---|---|---|
| 3,137,630 | 6/1964 | Hecker et al. | 252/194 X |
| 3,393,155 | 7/1968 | Schutte et al. | 252/316 |
| 3,710,510 | 1/1973 | Tully et al. | 252/316 X |
| 3,767,787 | 10/1973 | Segal | 252/316 X |
| 3,790,497 | 2/1974 | Sato et al. | 252/316 |
| 4,020,005 | 4/1977 | Lang | 252/316 |

*Primary Examiner*—Richard D. Lovering
*Attorney, Agent, or Firm*—Wenderoth, Lind & Ponack

[57] ABSTRACT

A process for preparing microcapsules comprising a core of highly viscous liquid substance encapsuled with a wall of an aggregate of finely divided silica powder, which comprises adding the highly viscous liquid substance into a powder bed of the finely divided silica powder under stirring with a cutter. The microcapsules thus obtained have such a structure that the core of highly viscous liquid substance is coated with a wall of an aggregate of the finely divided silica powder and a gelatinized layer formed between the wall and the liquid core substance.

15 Claims, No Drawings

MICROCAPSULES HAVING A WALL OF INORGANIC SUBSTANCE AND PROCESS FOR THE PREPARATION THEREOF

BACKGROUND OF THE INVENTION

The present invention relates to microcapsules comprising a core of a liquid substance and a wall of an inorganic substance and a process for the preparation thereof. More particularly, the present invention relates to microcapsules of excellent properties having a wall of a highly chemically stable, highly heat-resistant inorganic substance, and capable of preventing the liquid core substance for oozing out from the capsules with the lapse of time.

Conventional process for preparing microcapsules comprising a core of a liquid substance and a outer shell wall of an inorganic substance can be classified roughly into a process wherein precipitation reaction is employed and a process wherein adhesion or forced adhesion of the inorganic wall substance is employed. However, it is difficult to form dense, uniform outer shell walls of capsules by any of those processes. In other words, since the outer wall of the capsule has very small cracks, openings or pin holes and, in addition, the wall is coarse or rough, the liquid core substance enclosed in the capsule is apt to be modified under the influence of the atmosphere such as oxygen, carbon dioxide and water contained in air, or apt to absorb water in air. Thus, the capsule has a defect that the core substance cannot be protected sufficiently stably. Further, if the core substance enclosed in the capsule is a volatile substance, the core substance is vaporized through the outer shell wall of the capsule. If the core substance has a strong smell, the smell is emitted through the outer shell wall of the capsule. if a perfume is used as the core substance, it is hard to protect the same for a long period of time due to vaporization thereof unfavorably.

Thus, according to the known processes for preparing microcapsules having an inorganic wall substance, it is difficult to protect a liquid core substance stably over a long period of time, since not only a chemically unstable substance, volatile substance and hygroscopic substance but also other substances may ooze out from the capsule through small openings of the outer shell wall or these liquid core substances may be influenced by, for example, oxidation by air. Those prior art processes have, therefore, been employed in very limited fields.

In another known process, a liquid substance is charged into a previously formed microballoon comprising a wall of inorganic substance. Such a capsule is prepared by treating the hollow microballoon under a high pressure to form cracks therein and then allowing the liquid substance to be absorbed in the balloon through the cracks. Therefore, the liquid core substance vaporizes or leaks out through the cracks formed in the wall to make it impossible to obtain an ever-stable capsule. Further, there has been attempted a process wherein the wall of inorganic substance is further coated with an organic high polymer substance to prevent the vaporization or leakage of the core substance. However, this coating process inevitably has a defect that superior properties of the micro-balloon, i.e. chemical stability and heat resistance due to the inorganic wall substance, cannot be exhibited sufficiently.

SUMMARY OF THE INVENTION

An object of the present invention is to provide microcapsules having a wall of an inorganic substance capable of enclosing a liquid core substance ever-stably.

Another object of the present invention is to provide microcapsules having a wall of an inorganic substance having excellent chemical stability and heat resistance but free from leakage of a liquid core substance.

Still another object of the present invention is to provide a process for efficiently and easily preparing microcapsules having a wall of an inorganic substance having excellent chemical stability and heat resistance but free from leakage of a liquid core substance.

The inventors have noted that fine powders of silica have a property of gelatinizing various liquid substances. The most characteristic features of the present invention resides in the use of the fine powders of silica as a wall comprising inorganic substance of the capsules.

The microcapsules having a wall of inorganic substance according to the present invention have such a structure that a core of highly viscous liquid substance is coated with a wall of an aggregate of the fine silica powder and a gelatinized layer formed between the wall and the liquid core substance. The gelatinized layer is formed because the liquid core substance placed in contact with the wall is gelatinized by gelatinization action of the fine silica powder of the wall. The microcapsules thus obtained have such a structure that the liquid core is coated not only with the wall of fine silica powder aggregate which is relatively coarse but also with the gelatinized layer formed inside the wall, whereby leakage, or oozing-out of the liquid core substance enclosed therein can be prevented. Further, the leakage of the core substance through the wall can be prevented securely, since the liquid core substance per se has a controlled fluidity due to its high viscosity.

The microcapsules of the above described structure can be prepared efficiently and easily by the process of the present invention. According to the present invention, microcapsules comprising a highly viscous liquid core substance enclosed with a wall of fine silica powder aggregate are obtained by adding the highly viscous liquid substance to be used as the core to a powder bed of fine silica powder under stirring with a cutter.

In the present invention, it is impossible to drop the liquid substance in the form of very small liquid drops onto the powder bed, since a highly viscous liquid substance is used as the core substance. Therefore, it is indispensable in the process of the present invention to stir, or agitate the silica powder bed with a cutter. By this means, even if the highly viscous liquid substance is dropped in the form of large liquid drops or poured or, in an extreme case, added as a mass into the fine silica powder bed, the liquid substance is divided into fine particles with the cutter in the powder bed and the fine particles are immediately coated with the surrounding fine silica powder to form microcapsules.

DETAILED DESCRIPTION OF THE INVENTION

The microcapsules according to the present invention comprise a liquid core substance the surface of which is coated with fine silica powder. Further, a gelatinized layer is formed between the coating layer of silica powder and the liquid substance by a gelatinization action of the fine silica powder. Thus, in the microcapsule structure, the liquid core substance is coated with the silica powder coating layer and the gelatinized layer formed inside the silica layer. Therefore, in cooperation with a high viscosity of the liquid substance used as the core, oozing-out of the liquid core substance through the wall can be prevented effectively.

The microcapsules having such a structure have chemical stability and heat stability owing to inorganic wall substance of silica, as well as form stability and mechanical strength highly superior to those of microcapsules having a wall of an inorganic substance obtained merely by coating the surface of the liquid core substance with the inorganic wall substance powder.

Preferered particle diameter of the fine silica powder used for coating the liquid substance to form microcapsules is in the range of about 1 to 100 m$\mu$. The fine silica powder is used in an amount sufficient for coating the surface of the liquid substance to form particles. Generally, it is used preferably in an amount of about 10 to 200 parts by weight per 100 parts by weight of the liquid substance.

For the purpose of reducing costs and improving surface physical properties of the microcapsules, a suitable proportion of the fine silica powder may be replaced with fine powders of bentonite, aluminium oxide, carbon black, calcium carbonate, talc, kaolin, pigments, magnesium carbonate, titanium oxide, zinc oxide, metals and plastics such as polyethylene and nylon.

The highly viscous liquid substances used as the core substance of the microcapsules according to the present invention are liquid substances having a viscosity of preferably above about 100 centipoise (cp) (at 20° C.), particularly above 500 cp (at 20° C.). However, liquid substances of a low viscosity can also be used after converting them into highly viscous substances by addition of a thickening agent. Therefore, every substance which is liquid or semi-liquid at ambient temperature can be employed as the core substance.

Thus, solvents such as alcohols, glycerols, ketones, esters, ethers, halogenated hydrocarbons, aromatic hydrocarbons and aliphatic hydrocarbons; plasticizers such as phthalates, adipates, phosphates, silicones, diphenyl chlorides and paraffin chlorides; acids and bases such as amines, sulfuric acids, hydrochloric acid and aqueous caustic solutions; chemical liquids; inks; catalysts such as hydroperoxides, hardening agents, oxidizing agents, reducing agents and initiators; adhesives such as water-soluble sizing agents, epoxy isocyanates and polysulfides; perfumes; oils and fats; and seasonings can be selected suitably according to the use of the capsules.

In case liquid substances of a relatively low viscosity, for example, a viscosity of less than about 100 cp, are to be converted to highly viscous liquid substances by addition of thickening agents, any thickening agent may be used which can increase viscosity of the liquid substance without modifying properties thereof. As preferred thickening agents, there may be mentioned polybutene-1, polypentene, polybutadiene, polyisoprene, polychloroprene, polyoxymenthylene, polyamide, polycarbonate, polyvinyl pyrrolidone, polypropylene oxide, polystyrene, polyvinyl acetate, polyvinyl formal, polyvinyl acetal, polyvinyl butyral, fatty acid polyesters, phenol resin, polyvinyl chloride, polyacrylates, polymethacrylates, ester gums, polymethyl isobutyl ketone, alkyd resin and urea resin. Further, there may also be used methylcellulose, nitrocellulose, cellulose acetate, cellulose tributyrate, carboxymethylcellulose, hydroxypropylmethylcellulose, polyvinyl alcohol and so forth.

A gelatinizer which rather gelatinizes the liquid substance than increases viscosity thereof may added to the liquid substances of a low viscosity to prepare highly viscous liquid substances of a low fluidity. As compounds usable as such a gelatinizer, there may be mentioned, for example, dibenzylidenesorbitol, tribenzylidenesorbitol, aluminium oleate, aliphatic polyamides, polyethylene oxide, aluminium stearate, calcium stearate, organic bentonite and so forth.

The above mentioned thickening agents and gelatinizers may be used in a suitable amount for obtaining a desired viscosity without modifying the liquid substances. The thickening agents may be used together with the gelatinizers.

A mixture in the form of a paste obtained by mixing the liquid core substance with various powdery substances may be employed as the highly viscous liquid substance of a low fluidity. In such a pasty mixture, the liquid substance is kept by the capillarity of occlusion capacity of the powdery substances. Consequently, oozing-out of the liquid substance can be prevented effectively and, in addition, mechanical stability of the capsules is also enhanced. As the powdery substances used for this purpose, there may be used any of stable powders of a particle diameter of less than about 10$\mu$, preferably less than 1$\mu$ which do not react with the liquid substance. Preferred powdery substances are, for example, gelatinized calcium carbonate, magnesium carbonate, talc, carbon black, organic pigments, inorganic pigments, ultrafine powders of metals, kaolinite, kaolin, zeolite, barium ferrite magnetic particles, barium carbonate kaolin clay, graphite, silicic acid, ultrafine aluminum oxide, ultrafine titanium oxide, magnetite, lithopone, diatomaceous earth and so forth. These powdery substances are used in an amount suitable for obtaining a paste of a desired viscosity and occlusion capacity by kneading the same with the liquid substance.

The process for preparing the microcapsules of the present invention will be described below.

First, a highly viscous liquid substance used as core substance is prepared. In case a liquid which intrinsically has a high viscosity is employed, the liquid is used directly as the core substance. In case a liquid of a low viscosity is employed, a thickening agent is added thereto as described above and, if necessary, the mixture is heated to dissolve or disperse the thickening agent therein to obtain a highly viscous liquid substance. A liquid substance may, in other cases, be gelatinized with a gelatinizer or mixed with a powdery substance to obtain a pasty mixture to be used as the highly viscous liquid substance.

Then, fine silica powder is placed in a stirring device provided with a rotary or reciprocating cutter, or blade, to form a silica powder bed. The highly viscous liquid substance prepared as above is added to the silica powder bed to coat the surface of liquid substance with the fine silica powder. In this step, the liquid substance may be added thereto as large liquid drops or may be poured continuously, since the liquid substance cannot be formed into very small liquid particles due to a high viscosity thereof. In the fine silica powder bed, the liquid substance is once formed into masses or strands but they are immediately divided into fine particles by the stirring with the cutter. The fine particles are directly coated with the surrounding fine silica powder to form a microcapsules having a non-adhesive inorganic wall very efficiently in a very short period of time. In case a highly viscous liquid substance gelatinized into a gel by the addition of a gelatinizer or mixed with a powdery substance into a paste is used, the microcapsulation is also possible by introducing the same as a mass in the fine silica powder bed and stirring it with the cutter to obtain microcapsules of a size in the range of about 1 to 200μ. It should be understood, however, that microcapsules of greater than 200μ may be produced if desired. Stirring rate of the cutter is selected suitably depending on structure of the cutter, variety of the liquid substance and particle diameter of the fine silica powder. Generally, a stirring rate of about 500 to 20,000 rpm is preferred.

The microcapsules thus obtained have such a structure that the liquid core substance is coated with a surrounding wall comprising fine silica powder aggregate and a gelatinized layer formed inside wall. Oozing-out of the core substance can be prevented effectively due to this structure. However, a higher sealing property is required sometimes according to a variety of the liquid core substance or application of the microcapsules. An effective process for improving the sealing property comprises adding a high molecular compound having carboxyl group, sulfone group or a salt thereof in a terminal or side chain to a liquid core substance, coating thus obtained highly viscous liquid substance with fine silica powder to obtain capsules and treating the surface of the capsules with a compound of a metal having a valence of 2 or higher. By this treatment, the high molecular compound is contacted with the metal compound through pores with might be present in the silica wall, whereby they react together to precipitate an insoluble metal salt. The metal salt stops up the pores of the silica wall, thereby increasing sealing property of the capsules.

As concrete examples of the high molecular compounds having carboxyl group, sulfone group or a salt thereof in a terminal or side chain, there may be mentioned sodium polyacrylate, sodium polymethacrylate, maleic acid resin, polyacrylic acid-styrene copolymer, 2,ω-carboxypolybutadiene, 2,ω-carboxypolyisoprene, polyacrylic acid, carrageenan, agar, ammonium polyacrylate, polyacrylic acid-alkanolamine salts, polyacrylic ester-maleic acid copolymer, maleic acid modified resin, alginic acid, carboxymethylcellulose, polyvinylsulfonic acid and so forth.

As the metal compounds which react with those high molecular compounds to form insoluble metal salts, there may be mentioned chlorides, hydroxides, sulfates, nitrates, carbonates and acetates of metals having a valence of 2 or higher. Concretely, there may be used preferably calcium chloride, calcium carbonate, calcium acetate, calcium nitrate, aluminium chloride, magnesium chloride, magnesium sulfate, magnesium carbonate, calcium hydroxide, nickel acetate, iron chloride, nickel chloride, etc.

The treatment of the outer surface of the capsules with the metal compound may be effected by a process wherein microcapsules having a silica wall are coated with a solid powder of the metal compound, a process wherein a melt or a solution of the metal compound is poured onto the microcapsules having silica wall under slow stirring or a process wherein the microcapsules having silica wall are dispersed in a solution of the metal compound and then the microcapsules are taken out.

In the microcapsules of the present invention, the liquid core substance may be selected from liquid substances in a wide range according to applications thereof. An example of the applications of the microcapsules of the present invention will be given below wherein the microcapsules are used for the preparation of a rubber eraser with which not only a pencil mark but also a drawing lead mark, color pencil mark, India ink mark and oil or aqueous ink mark can be erased.

It has been known that for erasing the above mentioned marks, it is effective that a solvent (hereinafter referred to as erasing liquid) for a binder resin and/or dye contained in the marks is applied thereto to dissolve the binder resin and the dye, thereby allowing the resin and dye to rise to the surface and then the resin and dye are removed. However, such an erasing liquid cannot be used easily like solid rubber eraser or plastic eraser due to its lquid form. Under the circumstances as above, there has been proposed a solid eraser prepared by kneading an erasing liquid together with an eraser base comprising a synthetic resin such as polyvinyl chloride and then molding the mixture. However, such a solid eraser has problems that solvent effect of the erasing liquid is reduced, since the liquid has been mixed with a plasticizer, etc. contained in the eraser base and that molecules of the erasing liquid have been dispersed in the molded eraser base and the erasing liquid is discharged in the rubbish of the eraser base without exhibiting its erasing effect.

After investigations for the purpose of solving the problems, the inventors have succeeded in obtaining a solid eraser by first preparing microcapsules of the present invention which comprises an erasing liquid as core substance and fine silica powder aggregate as a coating wall, and then dispersing the microcapsules in an eraser base made of a synthetic resin. When the eraser was used, binder resins and dyes contained in the above described various marks could be dissolved in the erasing liquid as the capsule core and thereby removed completely.

As the erasing liquid used as the core substance of the capsules, there may be used any solvent in which the binder resin and/or dye are/is soluble without any special limitation. The solvents include, for example, 2-ethoxyethyl acetate, diethylene glycol monomethyl ether, triethylene glycol monoethyl ether, triethylene glycol monobutyl ether, diethylene glycol monohexyl ether, tetraethylene glycol monobutyl ether, tetraethylene glycol monopropyl ether, ethylene glycol monoacetate, ethylene glycol hexyl ether, morpholine, N-methylmorpholine, dimethyl tartrate, N-β-hydroxyethylacetamide, formaldehyde, N-methylformaldehyde, dimethylformamide, dimethylsulfoxide, tetrahydrothiophenone, monoethanolamine, ethylene glycol, diethylene glycol thiodiglycol, triethylene glycol, pentyl acetate, tetrahydrofurfuryl alcohol, methyl lactate, 2-pyrrolidone, N-methyl-2-pyrrolidone, hexamethylphosphoroamide and so forth.

The erasing liquids may be added with a thickening agent or a gelatinizer to increase viscosities thereof before use if their viscosities are relatively low. However, if the capsules are used for the preparation of plastic erasers, it is not always necessary to increase viscosity of the erasing liquid core substance, since the capsules are dispersed in an eraser base synthetic resin to control vaporization of the erasing liquid core substance to some extent.

According to the present invention, there is provided microcapsules having such a structure that an erasing liquid core substance is coated with a wall of fine silica powder aggregate and a layer of gelatinized erasing liquid. Then, the capsules are mixed with an eraser base dispersion. As the eraser base dispersion, there may be used preferably a mixture of about 100 parts by weight of a resin such as polyvinyl choloride or vinyl acetate-vinyl chloride copolymer and about 30 to 200 parts by weight of a plasticizer. If necessary, a filler, a stabilizer, etc. may further be incorporated therein. As for viscosity of the eraser base dispersions, those ranging from a low viscosity to a viscosity as high as a paste can be used. The erasing liquid microcapsules are used preferably in an amount of about 1 to 100 parts by weight per 100 parts by weight of the resin. The mixture of the eraser base dispersion and the erasing liquid microcapsules is then molded by extrusion molding, injection molding or cast molding under heating in an ordinary manner into solid erasers.

The solid erasers thus obtained comprise the eraser base and microcapsules dispered in the case, and each of the microcapsules comprises the erasing liquid core coated with a wall of chemically and thermally stable inorganic substance. Therefore, the variety of the erasing liquid enclosed in the wall of inorganic substance is not limited. Further, even though the capsules are dispersed in the eraser base, the former is not chemically influenced by the components of the latter. In addition, there is no fear of thermal deterioration of the capsules in the molding operation of the eraser under heating. The erasing liquid can thus be kept in the form of a stable dispersion in the eraser base without contacting the erasing liquid with the eraser base, whereby the essential effect of the erasing liquid, i.e. effect of dissolving the binder resin and/or dye in the marks, can be maintained for a long period of time.

Advantages particularly obtainable by applying the microcapsules of the present invention for the preparation of erasers will be shown below.

If microcapsules having a wall of fine silica powder are dispersed in an eraser base, a platicizer contained in the eraser base and placed in contact with the silica wall is gelatinized to form a gelatinized plasticizer layer around the silica wall. It is considered that by the formation of such a gelatinized plasticizer layer, the eraser base and the microcapsules having the inorganic wall of different nature are combined in a body with the gelatinized plasticizer layer. Consequently, the microcapsules are broken as rubbishes are formed when the eraser is used, whereby the erasing liquid acts effectively on the marks to exhibit the excellent erasing effect of the eraser.

In case microcapsules of erasing liquid having a viscosity increased by addition of a thickening agent or a gelatinizer and thereby having a high thixotropy are to be employed for solid eraser, there is caused a phenomenon that a mixure of the erasing liquid and rubbishes is apt to adhere to the surface of paper or film subjected to the erasing treatment. For preventing such a phenomenon, a pasty, non-thixotropic mixture obtained by mixing the erasing liquid with an inorganic powder is used as the core of the capsules. As the inorganic powder, there may be used any substance which is inert to the erasing liquid or insoluble in the erasing solution or which does not gelatinize the erasing solution. The inorganic powder may be selected suitably in due consideration of the the erasing liquid to be combined therewith from a group comprising carbonates such as calcium carbonate and magnesium carbonate, metal oxides such as titanium oxide and zinc oxide, metal powders, pigments, siliceous sand, glass powders and so forth. Particle diameter of those inorganic powders should be selected carefully, since if too large particles are used, there is caused a fear of scratching the surface, treated, particularly in the treatment of films. Amount of the inorganic powder is generally in the range of about 20 to 200% by weight based on the erasing liquid, though it varies depending on the inorganic powder or the erasing liquid. If the inorganic powder is used in a larger amount, erasing liquid content of the microcapsule is reduced and the retention of the erasing liquid by the inorganic powder becomes excessive to make it impossible to sufficiently exhibit the effect of the erasing liquid when the eraser is used. If the inorganic powder is used in a smaller amount, on the other hand, retaining capacity of the inorganic powder for the erasing liquid is insufficient unfavorably.

The following examples are not for limiting the present invention but for illustrating the invention.

EXAMPLE 1

5 Party by weight of polyvinyl butyral (degree of butyralization 75%, average molecular weight 38,000) were dissolved in 100 parts by weight of triethylene glycol monohexyl ether (9.5 cp/20° C.) to obtain a highly viscous solution of 6,500 cp/20° C. A cylindrical vessel of a diameter of 10 cm and a height of 20 cm was provided with rotary blades (comprising four blades) of a domestic mixer so that the blades can be rotated. 30 Parts by weight of fine silica powder (average particle diameter 7 m$\mu$, surface area 200 m$^2$/g) were placed in the vessel to prepare a powder bed of a depth of about 10 cm.

The highly viscous solution was poured in the powder bed under stirring and the whole was stirred at 12,000 rpm for five minutes to obtain 130 parts by weight of dry non-sticky white microcapsules in the form of fine particle which could pass through a 200 mesh sieve. Some of the microcapsules gathered together to form an apparently one particle.

After the resulting microcapsules were allowed to stand on a filter paper for one month, the filter paper was not wetted and reduction in weight of the capsules was not caused at all.

EXAMPLE 2

3 Parts by weight of dibenzylidene sorbitol and 3 parts by weight of polystyrene were dissolved in 100 parts by weight of xylene (0.60 cp/25° C.) under heating. The solution was then cooled to room temperature to obtain a gelatinized product. The mass of the gelatinized product was thrown in 50 parts by weight of fine silica powder under stirring in the same stirring device as in Example 1 and the whole was stirred therein at 8,000 rpm for 8 minutes to obtain 145 parts by weight of non-sticky, white microcapsules in the form of fine particle which could pass through a 100 mesh sieve.

After the resulting microcapsules were allowed to stand on a filter paper for 15 days, oozing-out of the core substance was not observed at all.

EXAMPLE 3

100 Parts by weight of tripropylene glycol monomethyl ether (6.9 cp/20° C.) and 120 parts by weight of precipitated calcium carbonate (particle size 0.02–0.08$\mu$) were kneaded together with a three-roll kneader to obtain a highly viscous paste of 35,000 cp/20° C. The paste was poured in 35 parts by weight of fine silica powder (average particle diameter 7 mμ, surface area 200 m²/g) under stirring in an amount 2-liter stirring device provided with rotary blades and the whole was stirred therein at 12,000 rpm for five minutes to obtain 250 parts by weight of dry non-sticky white microcapsules in the form of fine particle which could pass through a 200 mesh sieve. Some of those microcapsules gathered together to form apparently one particle.

After the resulting microcapsules were allowed to stand on a filter paper for one month, the filter paper was not wet and reduction in weight of the capsules was not caused at all.

EXAMPLE 4

40 Parts by weight of carbon black (Thermal Black; average particle diameter 0.31μ) were added to 100 parts by weight of trisdimethylaminomethylphenol (180 cp/20° C.) to obtain a highly viscous paste. The paste mass was then thrown in 25 parts by weight of fine silica powder under stirring in the same stirring device as in Example 3 and the whole was stirred therein at 8,000 rpm intermittently for three minutes to obtain 160 parts by weight of non-sticky black fine powdery microcapsules which could pass through a 100 mesh sieve.

After the resulting microcapsules were allowed to stand on a filter paper for 15 days, oozing-out of the core substance was not observed at all.

EXAMPLE 5

10 Parts by weight of ammonium polymethacrylate were dissolved in 100 parts by weight of triethylene glycol monomethyl ether (boiling point 249° C.) to obtain a liquid core substance (1200 cp/25° C.). The core substance was poured in 30 parts by weight of silica powder (average particle diameter 12 mμ, surface area 200 m²/g) under stirring in an about one-liter stirring device provided with rotary blades and the whole was stirred therein at 15,000 rpm for three minutes. Thereafter, 10 parts by weight of calcium chloride hexahydrate molten by heat were poured in the stirring device and the whole was stirred therein at 5,000 rpm for 30 seconds to obtain 145 parts by weight of dry white powdery microcapsules which could pass through a 200 mesh sieve.

After the resulting microcapsules were allowed to stand on a filter paper for 10 days, the filter paper was not wetted and reduction in weight of the capsules was not caused at all.

For comparison, microcapsules obtained in the same manner as above except that calcium chloride hexahydrate for stopping pores of the capsule wall was omitted were also allowed to stand on the filter paper. The liquid core substance was oozed out. Ten days after, weight thereof was reduced by about 2%.

EXAMPLE 6

70 Parts by weight of boiled potatoes were kneaded thoroughly together with 30 parts of water containing 0.5 part of sodium alginate, 1.5 parts of polyvinyl alcohol and 0.5 part of sodium benzoate to obtain a pasty core substance. The core substance was thrown in 20 parts by weight of silica powder (average particle diameter 7 mμ, surface area 300 m²/g) under stirring in the same stirring device as in Example 1 and the whole was stirred therein at 15,000 rpm for two minutes. Then, the resulting capsules were transferred in a stainless steel vat. 10 Parts by weight of 30% aqueous calcium acetate solution were sprayed on the capsules under vibration. The capsules were air-dried to obtain 121 parts by weight of dry white microcapsules which could pass through a 30 mesh metal sieve.

The resulting microcapsules were allowed to stand in a plastic vessel for one month. No aggregation into a mass or conversion into sticky substance was observed.

For comparison, microcapsules obtained in the same manner as above except that the treatment with aqueous calcium acetate for stopping pores of the microcapsules wall was omitted were also allowed to stand. The microcapsules became sticky and aggregated into a mass after two weeks.

EXAMPLE 7

5 Grams of polyvinyl butyral were dissolved in 50g of tetraethylene glycol monopropyl ether. Then, the resulting solution (3,200 cp/25° C.) was thrown in 15g of fine silica powder (average particle diameter 7 mμ, surface area 300 m²/g, apparent density 60g/l) under stirring in an about one-liter stirring device provided with rotary blades and the whole was stirred therein at 10,000 rpm for three minutes to obtain 65g of dry white powdery microcapsules which could pass through a 200 mesh sieve.

Separately, the following components were mixed together thoroughly in a Henschel mixer to obtain an eraser base dispersion:

| | |
|---|---|
| Vinyl acetate-vinyl chloride copolymer | 150 g |
| Dioctyl phthalate | 100 g |
| Dioctyl azelate | 20 g |
| Ba-Zn stabilizer | 5 g |
| Lithopone | 2 g |
| Calcium carbonate | 25 g |
| Green pigment | 0.2 g |

65 Grams of the microcapsules were added to the base dispersion to obtain a mixed dispersion. The mixed dispersion was pressed at 120° C. for 15 minutes to obtain molded erasers.

The erasers thus obtained had the following very excellent erasing rates.

TABLE 1

| Marked surface | Writing tool | Erasing rate (%) |
|---|---|---|
| Paper of fine quality | Propelling pencil (HI-POLYMER LEAD HB; trade name of a product of Pentel Co., Ltd.) | 95[*1] |
| Opaque polyester film | Propelling pencil (POLYFIT LEAD P-2; trade name of a product of Pentel Co., Ltd.) | 90[*2] |
| Opaque polyester film | Color pencil (a commercial product, red) | 82[*3] |
| Opaque polyester film | Color pencil (a commercial product, black) | 85[*3] |
| Opaque polyester film | Color pencil (a commercial product, blue) | 91[*3] |
| Transparent polyester film | Oleophilic marker for overhead projector (a product of J. S. Staedtler) | 100[*2] |
| Tracing paper | Ball point pen N-510 (a product of Zebra Co., Ltd.) | 84[*3] |

Notes
[*1] Erasing rate was determined according to JIS S-6050 (1975)
[*2] Erasing rate was determined according to the JIS except that number of rubbing was 10 reciprocations and erasing load was 600g.
[*3] Erasing rate was determined according to the JIS except that number of rubbing was 20 reciprocations and erasing load was 600g.

EXAMPLE 8

120 Grams of a paste obtained by mixing 70 g of pentaethylene glycol monomethyl ether with 50 g of light calcium carbonate (particle size 0.2μ) were thrown in 24 g of fine silica powder (average particle diameter 12 mμ, surface area 200 m²/g, apparent specific gravity 60 g/l) under stirring in a 1200 cc stirring device provided with rotary blades and the whole was stirred therein at 12,000 rpm for two minutes to obtain 140 g of dry white powdery microcapsules which could pass a 200 mesh sieve.

Separately, the following components were mixed thoroughly with three-roll mixer to obtain an eraser base dispersion:

| | |
|---|---|
| Polyvinyl chloride (Geon 121; trade name of a product of Nihon Geon Co., Ltd.) | 150 g |
| Dioctyl phthalate | 80 g |
| Dioctyl adipate | 20 g |
| Ca-Zn Stabilizer (Mark SC-32; trade name of a product of Adeka Argus Co., Ltd.) | 5 g |
| Lithopone | 2 g |
| Calcium carbonate | 30 g |

The base dispersion was added with 50g of the microcapsules and they were mixed together to obtain a mixed dispersion. The mixed dispersion was pressed at 120° C. for 10 minutes to obtain an eraser. Erasing rate of the eraser was compared with that of a commercially available vinyl chloride eraser. The results are shown in Table 2.

TABLE 2

| | | Erasing rate (%) | |
|---|---|---|---|
| Marked surface | Writing tool | eraser containing microcapsules | commercial eraser |
| Paper of fine quality | Propelling pencil (HI-POLYMER LEAD HB; trade name of a product of Pentel Co., Ltd.) | 99(*1) | 92(*1) |
| Opaque polyester film | Propelling pencil (POLYFIT LEAD P-2: trade name of a product of Pentel Co., Ltd.) | 94(*2) | 68(*2) |
| Opaque polyester film | Color Pencil (a commercial product, red) | 85(*2) | 41(*2) |
| Tracing paper | Ball point pen N-510 (a product of Zebra Co., Ltd.) | 83(*2) | 42(*2) |
| Transparent polyester film | Oleophilic marker for overhead projector (a product of J.S. Staedtler) | 100(*1) | 27(*1) |
| Transparent polyester film | Aqueous marker for overhead projector (a product of J.S. Steadtler) | 100(*2) | (*2) not erased |

Notes:
(*1) and (*2) are the same as those in Table 1.

20 g of magnesium carbonate were added to the contents of the stirring device and stirring was continued for additional one minute to obtain 247 g of microcapsules which could pass a 200 mesh metal gauze.

Separately, the following components were mixed thoroughly in a Henschel mixer to obtain an eraser base dispersion:

| | |
|---|---|
| Vinyl acetate-vinyl chloride copolymer | 150 g |
| Dioctyl phthalate | 100 g |
| Dioctyl adipate | 30 g |
| Ba-Zn Stabilizer | 5 g |
| Titanium dioxide | 2 g |
| Magnesium carbonate | 20 g |
| Green Pigment | 0.2 g |

The base dispersion was added with 65 g of the microcapsules and they were mixed together to obtain a mixed dispersion. The mixed dispersion was pressed at 120° C. for 15 minutes to obtain an eraser. Erasing rate of the eraser was very high as shown in Table 3. Adhesion of rubbishes to the marked surface treated was not observed.

TABLE 3

| Marked surface | Writing tool | Erasing rate (%) |
|---|---|---|
| Paper of fine quality | Propelling pencil (HI-POLYMER LEAD HB; trade name of a product of Pentel Co., Ltd.) | 92(*1) |
| Opaque polyester film | Propelling pencil (POLYFIT LEAD P-2; trade name of product of Pentel Co., Ltd.) | 90(*2) |
| Opaque polyester film | Color pencil (a commercial product, blue) | 85(*2) |
| Transparent polyester film | Oleophilic marker for overhead projector (a product of J.S. Staedtler) | 100(*2) |
| Tracing paper | Ball point pen N-510 | |

EXAMPLE 9

200 Grams of a paste obtained by mixing 100 g of dimethyl adipate with 100 g of active zinc flower (particle size 0.8μ) were added to 35 g of fine silica powder (average particle diameter 7 mμ, surface area 380 m²/g, apparent specific gravity 60 g/l) under stirring in a 1,200 cc stirring device provided with rotary blades. After stirring the whole at 10,000 rpm for one minute,

TABLE 3-continued

| Marked surface | Writing tool | Erasing rate (%) |
|---|---|---|
| | (a product of Zebra Co., Ltd.) | 76(*2) |

Notes
(*1) and (*2) are the same as those in Table 1.

EXAMPLE 10

A paste obtained by mixing 50g of diethylene glycol monobutyl ether with 40g of magnesium carbonate (particle size 0.5μ) was added to 25g of fine silica powder (average particle diameter 12 mμ, surface area 200 m$^2$/g, apparent specific gravity 60 g/l) under stirring in an amount one-liter stirring device provided with rotary blades and the whole was stirred at 10,000 rpm for two minutes to obtain 111g of white microcapsules (A) which could pass through a 200 mesh sieve. Separately, 111g of microcapsules (B) were obtained in the same manner as above except that diethylene glycol monobutyl ether was replaced with 50g of diphenyl ether.

Each 30g of the microcapsules (A) and (B) were mixed together. The mixture was dispersed in 287g of the same eraser base dispersion as in Example 8. The mixed dispersion was pressed at 120° C. for 20 minutes to obtain an eraser.

Erasing effect of the eraser was quite excellent as shown in Table 4. Adhesion of rubbishes to the marked surface thus treated was not observed.

TABLE 4

| Marked surface | Writing tool | Erasing effect (*) |
|---|---|---|
| Transparent glass plate | Oleophilic marker (PENTEL FELT PEN F-50, black; trade name of a product of Pentel Co., Ltd.) | complete erased |
| Polypropylene plate | Oleophilic marker (PENTEL PEN N-50, black; trade name of a product of Pentel Co., Ltd.) | complete erased |
| Iron plate | Oleophilic marker (PENTEL WHITE 100W, white; trade name of a product of Pentel Co., Ltd.) | complete erased |

Note
(*): 12 Hours after marking, the marks were rubbed 5–6 times with the eraser by hand. The results were judged visually.

We claim:

1. A process for preparing microcapsules comprising a core of highly viscous liquid substances and a wall of a fine silica powder aggregate, which process comprises adding the highly viscous liquid substance into a powder bed of the fine silica powder under stirring with a cutter rotating at a rate in the range of 500 to 20,000 rpm.

2. The process according to claim 1, wherein the highly viscous liquid substance has a viscosity of at least 100 cp (20° C.).

3. The process according to claim 1, wherein the highly viscous liquid substance comprises a liquid substance added with a thickening agent.

4. The process according to claim 1, wherein the highly viscous liquid substance comprises a gelatinized substance obtained by adding a gelatinizer to a liquid substance.

5. The process according to claim 1, wherein the highly viscous liquid substance comprises a pasty mixture obtained by mixing a liquid substance with a powder.

6. The process according to claim 1, wherein the fine silica powder has a particle diameter of 1 to 100 mμ.

7. The process according to claim 1, wherein 10 to 200 parts by weight of the fine silica powder are used per 100 parts by weight of the highly viscous liquid substance.

8. The process according to claim 1, wherein the highly viscous liquid substance comprises a liquid substance added with a high molecular compound having carboxyl group, sulfone group or a salt thereof in a terminal or side chain of the high molecular compound, and the outer surface of the wall of resulting microcapsules are further treated with a compound of a metal having a valence of 2 or higher, thereby reacting the high molecular compound with the metal compound through pores of the wall of fine silica powder aggregate to precipitate an insoluble metal salt in the pores and consequently to result microcapsules of a high sealing property.

9. Microcapsules having a structure such that a core of highly viscous liquid substance is coated with a wall of fine silica powder aggregate having gelatinization action upon said high viscous liquid substance and a gelatinized layer disposed between the wall and the liquid core substance, said gelatinized layer being formed by the gelatinization of the liquid core substance placed in contact with the wall due to the gelatinization action of the fine silica powder of the wall, said microcapsules produced by the process of claim 1.

10. Microcapsules according to claim 9, wherein the highly viscous liquid substance has a viscosity of at least 100 cp (20° C.).

11. Microcapsules according to claim 9, wherein the highly viscous liquid substance comprises a liquid substance added with a thickening agent.

12. Microcapsules according to claim 9, wherein the highly viscous liquid substance comprises a gelatinized substance obtained by adding a gelatinizer to a liquid substance.

13. Microcapsules according to claim 9, wherein the highly viscous liquid substance comprises a pasty mixture obtained by mixing a liquid substance with a powder.

14. Microcapsules according to claim 9, wherein the fine silica powder has a particle diameter of 1 to 100 mμ.

15. Microcapsules according to claim 9, wherein pores of the wall of fine silica powder aggregate are stopped up with an insoluble metal salt which is formed by the reaction of a high molecular compound having carboxyl group, sulfone group or a salt thereof in a terminal or side chain with a compound of a metal having a valence of 2 or higher, the high molecular compound having previously been added to the liquid core substance, the metal compound being employed for the treatment of the outer surface of the wall of the capsule, and the reaction taking place through the pores of the wall.

* * * * *